(12) United States Patent
Jäger et al.

(10) Patent No.: US 9,919,727 B2
(45) Date of Patent: Mar. 20, 2018

(54) SHAFT FOR STEERING A MOTOR VEHICLE

(71) Applicants: ThyssenKrupp Presta AG, Eschen (LI); ThyssenKrupp AG, Essen (DE)

(72) Inventors: Bernhard Jäger, Wangen im Allgäu (DE); Janick Durot, Heerbrugg (CH); Marius Breuer, Lochau (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/128,192

(22) PCT Filed: Mar. 16, 2015

(86) PCT No.: PCT/EP2015/055471
§ 371 (c)(1),
(2) Date: Sep. 22, 2016

(87) PCT Pub. No.: WO2015/144483
PCT Pub. Date: Oct. 1, 2015

(65) Prior Publication Data
US 2017/0106895 A1 Apr. 20, 2017

(30) Foreign Application Priority Data
Mar. 26, 2014 (DE) .................. 10 2014 104 191

(51) Int. Cl.
*B62D 1/185* (2006.01)
*F16C 3/03* (2006.01)

(52) U.S. Cl.
CPC ............. *B62D 1/185* (2013.01); *F16C 3/03* (2013.01); *B60Y 2400/83* (2013.01); *B60Y 2410/1022* (2013.01)

(58) Field of Classification Search
CPC ....... B62D 1/185; F16C 3/03; B60Y 2400/83; B60Y 2410/1022
See application file for complete search history.

(56) References Cited

U.S. PATENT DOCUMENTS 4,402,236 A * 9/1983 Nishikawa ............. B62D 1/185
403/109.5
5,226,853 A * 7/1993 Courgeon .............. B62D 1/185
277/500

(Continued)

FOREIGN PATENT DOCUMENTS

DE 19647589 C 2/1998
DE 10352915 A 6/2005

(Continued)

OTHER PUBLICATIONS

International Search Report for International Patent Application No. PCT/EP2015/055471 dated Jun. 23, 2015 (dated Jul. 1, 2015).

*Primary Examiner* — Drew J Brown
(74) *Attorney, Agent, or Firm* — ThyssenKrupp North America, Inc.

(57) ABSTRACT

A shaft for a steering system of a motor vehicle may comprise an outer tube and an inner tube that can be telescoped relative to the outer tube. The inner tube may be guided fixedly in the outer tube so as to rotate with the outer tube in order to transmit torque. An inner end of the inner tube may be received in the outer tube. The shaft may further include a pull-out protection mechanism for impeding the inner tube from being pulled out of the outer tube. The pull-out protection mechanism may be disposed at the inner end of the inner tube and may include at least one sprung blocking element for impeding the pulling of the inner tube out of the outer tube in a positively locking manner.

20 Claims, 1 Drawing Sheet

(56) References Cited

U.S. PATENT DOCUMENTS

| | | | |
|---|---|---|---|
| 6,116,837 A | 9/2000 | Suhle | |
| 6,354,626 B1* | 3/2002 | Cartwright | B62D 1/184 |
| | | | 280/775 |
| 8,627,742 B2* | 1/2014 | Ridgway | B62D 1/192 |
| | | | 280/777 |
| 2004/0245759 A1* | 12/2004 | Yamada | B62D 1/185 |
| | | | 280/775 |
| 2005/0194775 A1* | 9/2005 | Bastein | B62D 1/185 |
| | | | 280/775 |
| 2010/0126300 A1* | 5/2010 | Tokioka | B62D 1/16 |
| | | | 74/493 |
| 2012/0325041 A1* | 12/2012 | Sakuma | B62D 1/16 |
| | | | 74/493 |
| 2013/0240286 A1* | 9/2013 | Asada | B62D 1/16 |
| | | | 180/417 |

FOREIGN PATENT DOCUMENTS

| | | | | |
|---|---|---|---|---|
| DE | 102004009188 A1 | 9/2005 | | |
| JP | 2017030476 A | * 2/2017 | | B62D 1/185 |
| WO | 2010086269 A1 | 8/2010 | | |

* cited by examiner

SHAFT FOR STEERING A MOTOR VEHICLE

CROSS REFERENCE TO RELATED APPLICATIONS

This application is a U.S. National Stage Entry of International Patent Application Ser. No. PCT/EP2015/055471, filed Mar. 16, 2015, which claims priority to German Patent Application No. DE 10 2014 104 191.7 filed Mar. 26, 2014, the entire contents of both of which are incorporated herein by reference.

FIELD

The present disclosure relates to shafts for steering systems and, more particularly, to shafts that have telescoping tubes.

BACKGROUND

Telescopic steering shafts for motor vehicles are known, in which telescopic steering shafts an inner spindle and an outer spindle which is complementary with respect thereto and is arranged coaxially with respect to the inner spindle are provided, which spindles can be telescoped relative to one another. In this way, an adjustable-position steering column can be provided in motor vehicles, by means of which steering column the steering wheel position can be adapted at least in the axial direction of the steering shaft to the respective driver's position, in order correspondingly to improve the ergonomics for the driver of the motor vehicle and therefore driving safety. Furthermore, telescopic steering shafts are known for safety steering columns, in which, in the case of a crash, the shaft yields or shortens, for example by virtue of the fact that the driver comes into contact with the steering wheel and then pushes the steering wheel back together with the steering shaft.

Telescopic steering shafts are used in motor vehicles between the steering gear and the steering column and, in addition to setting the position and crash safety, are also intended to compensate for small changes in the spacing between the steering gear and the steering column which occur, for example, on account of dynamic loads during driving operation as a result of the corresponding twisting of the chassis, but also as a result of movements of the steering gear in a rubber mount. These slight changes in the spacing are also intended to be compensated for by way of the telescopic steering shaft with as little noise as possible and such that they are not discernible to the driver.

In addition to a smooth-running and jolt-free axial adjustment, the steering shaft with the telescopic mechanism is also intended to provide as symmetrical a transmission of the steering torque as possible between the inner spindle and the outer spindle, with the result that the driver firstly cannot determine any difference between a steering lock in one direction and a steering lock in the other direction, and secondly any possible play during the transmission of the torque between the inner spindle and the outer spindle is not perceived by the driver.

In order to prevent the two parts which can be telescoped with respect to one another from sliding apart, in particular, during transport of the shaft which is assembled but has not yet been installed in a motor vehicle and during the actual installation of the shaft into the motor vehicle, pull-out protection means are known for limiting the pulling of the two telescopic parts out from one another. For example, DE 100 2004 009 188 A1 has disclosed an axially adjustable steering spindle, in which an inner tube has an outer spline system which provides a stop of the inner tube with respect to a sleeve which is screwed into the outer tube. As a result, a pull-out protection means or pull-out limiting means is provided.

WO 2010/086269 A1 has disclosed a telescopic shaft, in which the outer tube is sealed with respect to the inner tube by way of a seal.

BRIEF DESCRIPTION OF THE TABLES AND FIGURE

DETAILED DESCRIPTION

Figure 1:
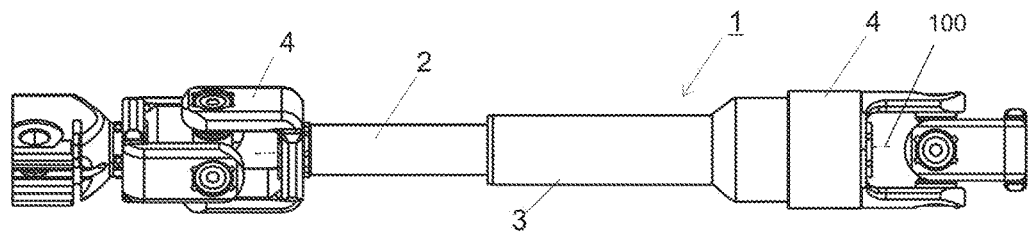
FIG. 1 is a schematic side view of an example shaft in an assembled state.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

Accordingly, a shaft for a steering system of a motor vehicle is proposed, comprising an outer tube and an inner tube which can be telescoped relative to the outer tube, the inner tube being guided fixedly in the outer tube so as to rotate with it in order to transmit a torque, and an inner end of the inner tube being received in the outer tube, a pull-out protection means for limiting the pulling of the inner tube out of the outer tube being provided at the inner end of the inner tube. According to the invention, the pull-out protection means has at least one sprung blocking element for limiting the pulling of the inner tube out of the outer tube in a positively locking manner.

By virtue of the fact that the pull-out protection means has at least one sprung blocking element for limiting the pulling of the inner tube out of the outer tube in a positively locking manner, a simple embodiment of a pull-out protection means can be provided. Here, the sprung blocking element can be configured in such a way that particularly simple assembly of the shaft is achieved. This is achieved by virtue of the fact that the inner shaft is pushed into the outer shaft, the blocking element first of all being compressed counter to its spring stress, and then, after an undercut in the outer tube has been passed over, the blocking element expanding on account of the spring stress in such a way that it henceforth provides a pull-out protection means for the inner tube with respect to the outer tube. In other words, a simple assembly can be achieved by way of the inner tube and the outer tube being pushed together, further assembly steps then no longer being necessary. Here, the sprung blocking element engages behind an undercut in the outer tube in such a way that a barb is provided.

The pull-out protection means can therefore also be attached only on the inner tube, with the result that complicated additional assembly steps for providing a pull-out protection means on the outer tube can be dispensed with.

The relieved blocking element is preferably arranged at an acute angle with regard to the axis of the inner tube. Here, the angle is preferably smaller than 90°, preferably smaller than 70°, particularly preferably smaller than 45°. As a result of this configuration of the blocking element with an acute angle in the direction of the main extent toward the inner tube, a blocking element which is directed counter to the push-in direction when pushing the inner tube into the outer tube can be configured, which blocking element, after springing back, simply forms a barb for limiting the pulling of the inner tube out of the outer tube. Furthermore, the corresponding angular configuration can achieve a situation where, even in the case of loading on the pull-out protection means, that is to say if an attempt is made to pull the inner tube out of the outer tube, a force component acts on the blocking element in such a way that it provides a resistance which is as high as possible to pulling of the inner tube out of the outer tube. In particular, in the case of an acute angle, compression loading of the blocking element substantially takes place, with the result that a resistance which is as high as possible is provided here for limiting the pulling-out action. The blocking element is of self-locking configuration in this way.

The outer tube can preferably provide an undercut, on which at least one blocking element for limiting the pulling of the inner tube out of the outer tube can be supported. By means of the undercut, a defined position in the outer tube can be provided in a simple way, at which defined position the locking of the inner tube on the outer tube is predetermined.

The outer tube particularly preferably has a region of smaller diameter, in which the inner tube is guided fixedly so as to rotate with it, and a region of larger diameter, in which the inner end of the inner tube is received together with the pull-out protection means, the undercut being configured at the transition of the region of larger diameter to the region of smaller diameter. The blocking element can particularly preferably also spring open in the radial direction behind the undercut of the outer tube when pushing the inner tube into the outer tube, in order to configure a barb for limiting the pulling of the inner tube out of the outer tube.

In order to provide a pull-out protection means which is as low-friction as possible or even friction-free, a plurality of blocking elements can be provided which, in the relieved state, together provide an external diameter which is smaller than the internal diameter of the outer tube in a region of the outer tube with a widened diameter. In this way, the blocking elements do not come into contact with the outer tube during normal operation. The blocking elements are supported on the outer tube and therefore provide the resistance against pulling out only when the pulling-out protection means is to provide limiting of the pulling-out action.

In order to make simple and rapid assembly of the pull-out protection means on the inner tube possible, the pull-out protection means preferably has a cylindrical section for introducing into the interior space of the inner tube, the cylindrical section having at least one positively locking element which can be locked in a depression, for example a groove, of the inner tube in a positively locking manner. In this way, the pull-out protection means can be attached to the inner tube both rapidly and simply, and also in a processing step ahead of the inner tube and the outer tube being pushed together.

In order to avoid blocking during the first pushing of the inner tube into the outer tube, the pull-out protection means preferably has a cylindrical section for introducing into the interior space of the inner tube with a length which is such that a section of the cylindrical body which is introduced into the inner tube projects beyond the inner end of the inner tube in such a way that all the blocking elements can be applied in a sprung manner substantially parallel to the cylindrical body. In this way, the blocking elements bear against the cylindrical section during the pushing-in action, with the result that blocking of the inner tube during the pushing-in action as a result of possible tilting or jamming of the blocking elements can be avoided.

In one advantageous embodiment, at least one sprung blocking element is prestressed radially outward into the blocking position in order to limit the pulling of the inner tube out of the outer tube, with the result that the blocking position which then corresponds to the relieved position of the sprung blocking element can be achieved reliably.

The pull-out protection means and, in particular, the blocking element are preferably configured from plastic, steel or spring steel. Plastic is particularly preferred, however.

The shaft can particularly preferably be configured either as a steering shaft or as a steering spindle, and can correspondingly be capable of being arranged either between a steering column and a steering pinion, or between the steering wheel and the steering shaft.

With reference now to the figures, it should be understood that identical, similar or identically acting elements in the different figures are denoted by identical designations and a repeated description of said elements is partially dispensed with in the following description, in order to avoid redundancies.

Figure 2:
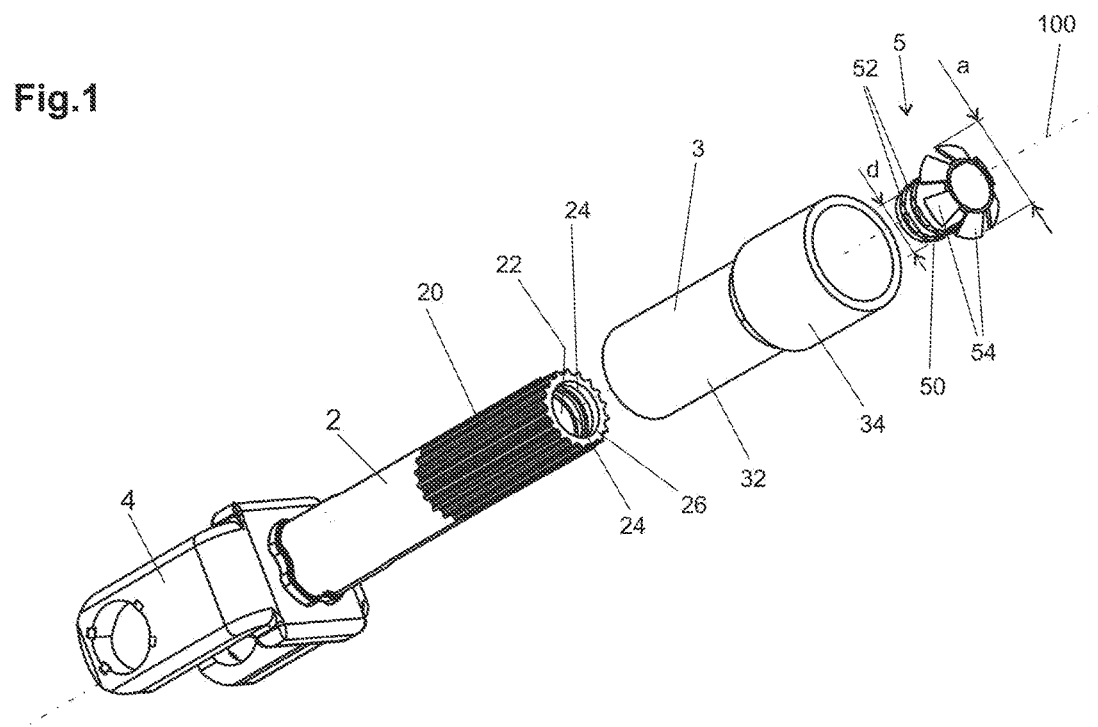
FIG. 2 is a schematic perspective partially-exploded view of an example shaft.
Figure 3:
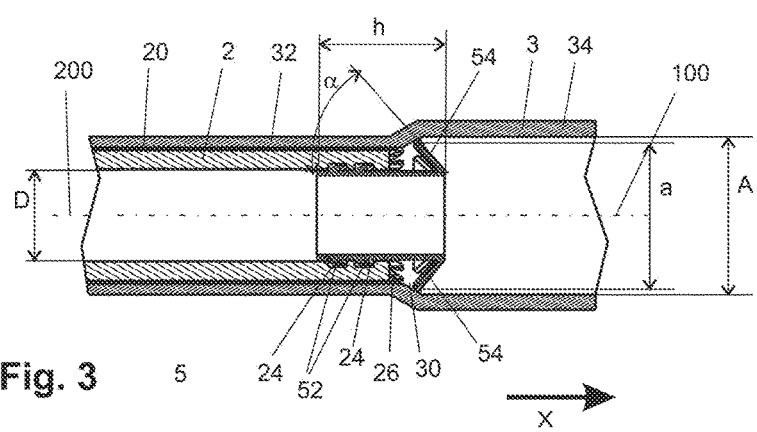
FIG. 3 is a schematic sectional view through an example inner tube that is received in an outer tube.

FIGS. 1 to 3 schematically show a shaft 1 which has an inner tube 2 and an outer tube 3. The inner tube 2 is arranged such that it can be telescoped axially in the outer tube 3, in such a way that an axial displacement of the inner tube 2 can take place with respect to the outer tube 3.

A fork 4 is arranged on the inner tube 2, which fork 4 is part of a universal joint, via which the inner tube 2 is connected on the output side to the following steering components. For example, a steering gear or a steering pinion can be provided in a known way at the output-side end of the shaft 1 which is shown as a steering shaft, via which steering gear or steering pinion the input steering torque is then transmitted to a rack and via track rods to the wheels to be steered of the motor vehicle.

A fork 4 is likewise arranged on the outer tube 3, which fork 4 is part of the universal joint, via which the outer tube 3 is connected to a drive-side end of the shaft 1. For example, a steering wheel can be attached at the drive-side end of the shaft 1 via a steering spindle which is guided in a steering column, via which steering wheel a driver can input a corresponding steering torque into the shaft 1.

As can be seen particularly clearly in FIG. 2, the inner tube 2 can be telescoped with respect to the outer tube 3 in the direction of the axis 100 of the shaft 1. The inner tube 2 is guided fixedly in the outer tube 3 so as to rotate with it via an outer spline system 20 which is in engagement with a complementary corresponding spline system (not shown in FIG. 2) in the outer tube 3. Accordingly, a steering torque which is to be transmitted to the inner tube 2 via the outer tube 3 can be transmitted substantially without play by means of the positively locking connection which is configured in this way. Although the shaft 1 can be telescoped axially in this way, it is substantially without play for a rotation about the axis 100 of the shaft 1.

A pull-out protection means 5 is provided at the inner end 26 of the inner tube 2, by means of which pull-out protection means 5 pulling of the inner tube 2 out of the outer tube 3 can be limited. The inner end 26 of the inner tube 2 is received in the outer tube 3 in the assembled state of the shaft 1.

The pull-out protection means 5 has a plurality of sprung blocking elements 54 which are prestressed toward the outside. In other words, the blocking elements 54 point toward the outside, that is to say away from the axis 200 of the inner tube 2, when they are relieved and when therefore the spring which is configured by them is relieved.

As arises from the sectional illustration of FIG. 3, the blocking elements 54 are arranged at an acute angle α toward the axis 200 of the inner tube 2 in such a way that the ends of the blocking elements 54 point toward the main extent of the inner tube 2. During first-time assembly of the shaft 1, the inner tube 2 is pushed into the outer tube 3 in the push-in direction X, with the result that the blocking elements 54 first of all spring back so as to point toward the rear and then, as shown in FIG. 3, spring apart from one another in such a way behind an undercut 30 of the outer tube 3 that the inner tube 2 can no longer be pulled back with respect to the outer tube 3 counter to the push-in direction X beyond said position. Accordingly, after passing over the undercut 30 with the pull-out protection means 5 when pushing the inner tube 2 into the outer tube 3, the blocking elements 54 form a barb which counteracts pulling back of the inner tube 2 with respect to the outer tube 3 counter to the push-in direction X. In order to limit the pulling of the inner tube 2 out of the outer tube 3, the blocking elements 54 and, in particular, their ends are supported on the undercut 30 of the outer tube 3.

The outer tube 3 has a section with a smaller diameter 32, the internal diameter of which corresponds substantially to the external diameter of the inner tube 2. In said section of smaller diameter 32 of the outer tube 3, the inner tube 2 is guided substantially without play in the rotational direction and such that it can be telescoped in the axial direction. In said section of smaller diameter 32, the internal spline system of the outer tube 3 which is complementary with respect to the external spline system 20 of the inner tube 2 is also arranged in such a way that a rotationally fixed connection substantially without play is provided between the inner tube 2 and the outer tube 3.

Furthermore, the outer tube 3 provides a section of widened diameter 34 which has an internal diameter A which is greater than the external diameter of the inner tube 2. The internal diameter A of the outer tube 3 in the section of widened diameter 34 also has a greater diameter than the greatest diameter a of the pull-out protection means 5. The greatest diameter a of the pull-out protection means 5 is defined, in particular, by way of the diameter of all blocking elements 54 in their relieved, extended blocking state. Accordingly, a displacement of the inner tube 2 with respect to the outer tube 3 can be carried out without the relieved blocking elements 54 being in contact in the outer tube 3, in particular in its region of widened diameter 34. Therefore, no friction at all occurs here between the pull-out protection means 5 and the outer tube 3, with the result that the displacement force between the inner tube 2 and the outer tube 3 is not influenced by way of the pull-out protection means 5.

The pull-out protection means 5 is inserted into the interior space 22 of the inner tube 2. To this end, the pull-out protection means 5 has a cylindrical section 50 which has an external diameter d which corresponds substantially to the internal diameter D of the interior space 22 of the inner tube 2. Accordingly, the cylindrical section 50 can be introduced simply into the inner tube 2.

In order to hold the pull-out protection means 5 in the inner tube 2, elastic positively locking elements 52 are provided on the outer side of the cylindrical section 50 in the exemplary embodiment which is shown, which positively locking elements 52 can latch into complementary grooves 24 which are provided in the inner tube 2. The positively locking elements 52 are prestressed radially and correspondingly spring into the grooves 24 during the introduction of the cylindrical section 50 when the pull-out protection means 5 is pushed at the inner end 26 into the inner tube 2. Accordingly, the pull-out protection means 5 can be latched into the inner tube 2 in a simple way, with the result that simple assembly of the pull-out protection means 5 becomes possible.

Furthermore, the pull-out protection means 5 can have already been connected to the inner tube 2 in a preceding process step and, in particular, can have been clipped simply into the latter, by the positively locking elements 52 latching into the corresponding grooves 24 at that end 26 of the inner tube 2 which is guided in the outer tube 3.

During the connection of the inner tube 2 to the outer tube 3, the inner tube 2 is pushed into the outer tube 3 in the push-in direction X, the blocking elements 54 bearing against the cylindrical body 50 of the pull-out protection means 5 toward the rear, that is to say counter to the push-in direction X. After the inner end 26 of the inner tube 2 or the front end of the pull-out protection means 5 has reached the region of larger diameter 34 of the outer tube 3 and has therefore passed over the undercut 30, the blocking elements 54 spring outward on account of their spring prestress and configure the barb. The blocking elements 54 then come into contact with the undercut 30 if the inner tube 2 is to be pulled out with respect to the outer tube 3 counter to the push-in direction X beyond the position which is defined by way of the undercut 30 and the geometry of the pull-out protection means 5.

Accordingly, the pull-out protection means 5 provides a securing means against unintentional pulling of the inner tube 2 out of the outer tube 3. At the same time, however, particularly simple assembly can be achieved by way of simple pushing of the inner tube 2 into the outer tube 3.

The acute angle α between the respective blocking element 54 and the axis 200 of the inner tube 2 preferably lies at below 90°, particularly preferably below 70° and very particularly preferably below 45° in the blocking position, that is to say the relieved position, of the blocking elements 54, in such a way that, if a pulling-out force which is to be stopped by way of the pull-out protection means 5 is applied, mainly a compression is applied to the blocking elements 54, which compression also configures the barb to be self-locking.

The pull-out protection means 5 can either be configured from plastic, or else from steel or a spring steel, with the result that a reliable configuration even of the prestressed blocking elements 54, just like the prestressed positively locking elements 52, can be provided.

In order to make it possible for the blocking elements 54 to spring back during pushing of the inner tube 2 into the region of smaller diameter 32 of the outer tube 3, without it being possible for blocking or jamming of the inner tube 2 in the outer tube 3 to take place as a result of the thickness of the blocking elements 54, the cylindrical section 50 preferably has a length h which is configured in such a way that a part of the cylindrical section 50 protrudes beyond the inner end 26 of the inner tube 2 in the push-in direction X in such a way that the blocking elements 54 can be deflected substantially onto the cylindrical section 50 counter to the spring prestress without abutting the inner end 26 of the inner tube 2. In other words, the cylindrical section 50 preferably projects in front of the inner end 26 to such an extent as corresponds at least to the length of the blocking elements 54 in the completely deflected, retracted state. This can avoid a situation where, when the inner tube 2 is pushed into the outer tube 3 during the first assembly, the diameter of the pull-out protection means 5 with the blocking elements 54 which are approximated to the cylindrical section 50 counter to the push-in direction X does not exceed the internal diameter of the region of smaller diameter 32 of the outer tube 3. In this way, obstacle-free pushing of the inner tube 2 into the outer tube 3 without jamming or blocking can be achieved.

If applicable, all individual features which are shown in the individual exemplary embodiments can be combined with one another and/or exchanged for one another, without departing from the scope of the invention.

What is claimed is:

1. A shaft for a steering system of a motor vehicle, the shaft comprising:
    an outer tube;
    an inner tube being guided fixedly in the outer tube such that the inner tube can telescope relative to the outer tube, the inner tube rotating with the outer tube such that torque is transmitted between the inner and outer tubes, wherein an inner end of the inner tube is received in the outer tube; and
    a pull-out protection mechanism that is disposed at the inner end of the inner tube and helps secure the inner tube within the outer tube, the pull-out protection mechanism including a sprung blocking element that impedes the inner tube from being pulled out of the outer tube,
    wherein the outer tube comprises an undercut on which the sprung blocking element can be supported,
    wherein the sprung blocking element springs open behind the undercut as the inner tube is pushed into the outer tube, wherein the sprung blocking element forms a barb that impedes the inner tube from being pulled out of the outer tube.

2. The shaft of claim 1 wherein the outer tube comprises a region of smaller diameter and a region of larger diameter, the undercut being disposed at a transition between the two regions, wherein inner tube is guided fixedly in the region of smaller diameter in a way such that the inner tube rotates with the outer tube, wherein the region of larger diameter receives the inner end of the inner tube and the pull-out protection mechanism.

3. The shaft of claim 1 wherein the sprung blocking element is disposed at an acute angle with respect to a longitudinal axis of the inner tube.

4. The shaft of claim 1 wherein the sprung blocking element is prestressed outward into a blocking position to impede the inner tube from being pulled out of the outer tube.

5. A shaft for a steering system of a motor vehicle, the shaft comprising:
    an outer tube;
    an inner tube being guided fixedly in the outer tube such that the inner tube can telescope relative to the outer tube, the inner tube rotating with the outer tube such that torque is transmitted between the inner and outer tubes, wherein an inner end of the inner tube is received in the outer tube; and
    a pull-out protection mechanism that is disposed at the inner end of the inner tube and helps secure the inner tube within the outer tube, the pull-out protection mechanism including a sprung blocking element that impedes the inner tube from being pulled out of the outer tube,
    wherein the outer tube comprises a region of smaller diameter and a region of larger diameter, wherein the sprung blocking element is one of a plurality of sprung blocking elements of the pull-out protection mechanism, wherein an external diameter of the plurality of sprung blocking elements is smaller than an internal diameter of the outer tube in the region of larger diameter.

6. The shaft of claim 5 wherein the sprung blocking element is prestressed outward into a blocking position to impede the inner tube from being pulled out of the outer tube.

7. The shaft of claim 5 configured for use as a steering shaft or a steering spindle.

8. The shaft of claim 5 wherein the sprung blocking element is disposed at an acute angle with respect to a longitudinal axis of the inner tube.

9. A shaft for a steering system of a motor vehicle, the shaft comprising:
    an outer tube;
    an inner tube being guided fixedly in the outer tube such that the inner tube can telescope relative to the outer tube, the inner tube rotating with the outer tube such that torque is transmitted between the inner and outer tubes, wherein an inner end of the inner tube is received in the outer tube; and
    a pull-out protection mechanism that is disposed at the inner end of the inner tube and helps secure the inner tube within the outer tube, the pull-out protection mechanism including a sprung blocking element that impedes the inner tube from being pulled out of the outer tube,
    wherein the pull-out protection mechanism comprises a cylindrical section that is at least partially received by an interior space of the inner tube, the cylindrical section including a locking element that is received by a depression of the inner tube to secure the cylindrical section of the pull-out protection mechanism to the inner tube.

10. The shaft of claim 9 wherein the sprung blocking element is disposed at an acute angle with respect to a longitudinal axis of the inner tube.

11. The shaft of claim 9 wherein the sprung blocking element is prestressed outward into a blocking position to impede the inner tube from being pulled out of the outer tube.

12. A shaft for a steering system of a motor vehicle, the shaft comprising:
    an outer tube;
    an inner tube being guided fixedly in the outer tube such that the inner tube can telescope relative to the outer tube, the inner tube rotating with the outer tube such that torque is transmitted between the inner and outer tubes, wherein an inner end of the inner tube is received in the outer tube; and
    a pull-out protection mechanism that is disposed at the inner end of the inner tube and helps secure the inner tube within the outer tube, the pull-out protection mechanism including a sprung blocking element that impedes the inner tube from being pulled out of the outer tube,
    wherein the pull-out protection mechanism comprises a cylindrical section that is at least partially received by an interior space of the inner tube, the cylindrical section having a length such that a section of the cylindrical section projects beyond the inner end of the inner tube, wherein the sprung blocking element can be forced into a position that is substantially parallel to the cylindrical section.

13. The shaft of claim 12 wherein the sprung blocking element is disposed at an acute angle with respect to a longitudinal axis of the inner tube.

14. The shaft of claim 12 wherein the sprung blocking element is prestressed outward into a blocking position to impede the inner tube from being pulled out of the outer tube.

15. A shaft for a steering system of a motor vehicle, the shaft comprising:
    an outer tube including a first region and a second region, wherein a diameter of the first region is smaller than a diameter of the second region, the outer tube further including a transition between the first and second regions;
    an inner tube disposed at least partially within the outer tube, the inner tube being connected to the outer tube in a manner such that the inner tube moves axially relative to the outer tube but such that torque is transmitted between the inner and outer tubes, with the inner tube rotating with the outer tube; and
    a barb disposed at an inner end of the inner tube, wherein the barb impedes the inner tube from being pulled out of the outer tube when the barb contacts the transition of the outer tube.

16. The shaft of claim 15 wherein the barb is flexible and can be forced into a position that is substantially parallel to a longitudinal axis of the inner tube.

17. The shaft of claim 15 wherein the barb is disposed at an acute angle with respect to a longitudinal axis of the inner tube.

18. The shaft of claim 15 further comprising a spline system disposed on at least one of the inner tube or the outer tube, the spline system allowing the inner tube and the outer tube to transmit torques to one another and to rotate together.

19. The shaft of claim 15 wherein an outermost part of the barb is radially smaller than an internal diameter of the second region of the outer tube.

20. The shaft of claim 15 wherein the barb is prestressed outward into a blocking position to impede the inner tube from being pulled out of the outer tube.

* * * * *